United States Patent
Ji

(10) Patent No.: US 12,012,114 B2
(45) Date of Patent: Jun. 18, 2024

(54) INTEGRATION MODULE FOR ADVANCED DRIVER ASSISTANCE SYSTEM

(71) Applicant: HYUNDAI MOBIS Co., Ltd., Seoul (KR)

(72) Inventor: Yong Kwan Ji, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 363 days.

(21) Appl. No.: 17/098,458

(22) Filed: Nov. 16, 2020

(65) Prior Publication Data
US 2021/0146947 A1    May 20, 2021

(30) Foreign Application Priority Data

Nov. 20, 2019 (KR) .......................... 10-2019-0149943
Dec. 31, 2019 (KR) .......................... 10-2019-0179094

(51) Int. Cl.
*G01C 21/36* (2006.01)
*B60K 35/00* (2006.01)
(Continued)

(52) U.S. Cl.
CPC ............. *B60W 50/14* (2013.01); *B60K 35/00* (2013.01); *B60W 40/06* (2013.01); *B60W 40/08* (2013.01);
(Continued)

(58) Field of Classification Search
CPC ...... B60W 50/14; B60W 40/06; B60W 40/08; B60W 2040/0818; B60W 2050/0022;
(Continued)

(56) References Cited

U.S. PATENT DOCUMENTS

2019/0050692 A1* 2/2019 Sharma ................. G06F 18/254

FOREIGN PATENT DOCUMENTS

| CN | 105096629 A | 11/2015 |
| CN | 208376643 U | 1/2019 |

(Continued)

OTHER PUBLICATIONS

Office Action dated Jun. 1, 2023 from the Chinese Patent Office for Chinese Patent Application No. 202011286836.4.
(Continued)

*Primary Examiner* — Brian P Sweeney
(74) *Attorney, Agent, or Firm* — NSIP Law

(57) ABSTRACT

A signal processing module is provided. The signal processing module includes a function weight table that stores weights for each first sensor for an autonomous driving mode and an ADAS driving mode and selects and outputs only the weight for each first sensor, a first weight applying device that generates a function weight application signal by applying the weight for each first sensor to sensing information of sensors for sensing an object, a road environment determining device that determines a road environment based on the sensing information of the sensors for sensing the object, a road environment weight table that stores weights for each second sensor for a road environment and selects and outputs an weight for each second sensor, and a second weight applying device that outputs a dataset by applying the weight for each second sensor to the function weight application signal.

5 Claims, 12 Drawing Sheets

(51) Int. Cl.
*B60W 40/06* (2012.01)
*B60W 40/08* (2012.01)
*B60W 50/14* (2020.01)
*B60K 35/22* (2024.01)
*B60K 35/53* (2024.01)
*B60K 35/60* (2024.01)
*B60W 50/00* (2006.01)

(52) U.S. Cl.
CPC ............ *B60K 35/22* (2024.01); *B60K 35/53* (2024.01); *B60K 35/60* (2024.01); *B60K 2360/797* (2024.01); *B60W 2040/0818* (2013.01); *B60W 2050/0022* (2013.01); *B60W 2050/146* (2013.01); *B60W 2540/221* (2020.02); *B60W 2555/20* (2020.02)

(58) Field of Classification Search
CPC ..... B60W 2050/146; B60W 2540/221; B60W 2555/20; B60W 30/182; B60W 50/082; B60W 60/00; B60W 2050/0043; B60K 35/00; B60K 2370/67; B60K 2370/797; G01S 7/003; G01S 13/862; G01S 13/865; G01S 13/867; G01S 15/931; G01S 17/931; G01S 2013/932; G01S 13/931; G06V 20/58

See application file for complete search history.

(56) References Cited

FOREIGN PATENT DOCUMENTS

| | | |
|---|---|---|
| CN | 208477372 U | 2/2019 |
| CN | 109690653 A | 4/2019 |
| JP | 2018-197010 | 12/2018 |
| KR | 2017-0081137 A | 7/2017 |
| KR | 10-2018-0109190 | 10/2018 |
| KR | 10-2019-0054640 | 5/2019 |
| KR | 10-1984762 | 6/2019 |

OTHER PUBLICATIONS

Office Action dated Aug. 17, 2023 from the Korean Patent Office for Korean Patent Application No. 20190149943.

* cited by examiner

INTEGRATION MODULE FOR ADVANCED DRIVER ASSISTANCE SYSTEM

CROSS-REFERENCE TO RELATED APPLICATION

This application claims priority from and the benefit of Korean Patent Application No 10-2019-0149943, filed on Nov. 20, 2019 and Korean Patent Application No 10-2019-0179094, filed on Dec. 31, 2019, which is hereby incorporated by reference for all purposes as if set forth herein.

BACKGROUND

Field

Exemplary embodiments relate to a signal processing module for supporting both of an autonomous driving system and an advanced driver assistance system (ADAS) located in a vehicle and a system integration module including the same.

Discussion of the Background

With the advancement of technology, for the convenience of users, various sensors, electronic devices, and the like have been provided in the vehicle. Particularly, research has been actively done for an ADAS for convenience of driving of users. In addition, autonomous vehicles have been actively developed.

Because it is able for a driver to select ADAS driving and autonomous driving, there is an urgent need to develop a system integration module capable of applying both ADAS driving and autonomous driving.

Furthermore, because an ADAS and an autonomous vehicle have to include a large number of sensors and electronic devices and because sensors and electronic devices are arranged again according to sizes and shapes of vehicles, a large number of sensors and electronic devices located in the vehicle act as a stumbling block in the popularization and distribution of ADAS and autonomous vehicles.

The above information disclosed in this Background section is only for enhancement of understanding of the background of the invention and, therefore, it may contain information that does not constitute prior art.

SUMMARY

Exemplary embodiments of the present invention has been made to solve the above-mentioned problems occurring in the prior art while advantages achieved by the prior art are maintained intact.

An aspect of the invention provides a signal processing module to which both of advanced driver assistance system (ADAS) driving and autonomous driving are applicable and a system integration module including the same.

Another aspect of the invention provides a signal processing module for applying a weight to sensing results of sensors used during ADAS driving or autonomous driving and a system integration module including the same.

Another aspect of the invention provides an ADAS integration module for moving electronic components located in a module when various electronic components used in the ADAS are mounted on the module to locations of electronic components mounted according to predetermined layout information.

The technical problems to be solved by the present invention are not limited to the aforementioned problems, and any other technical problems not mentioned herein will be clearly understood from the following description by those skilled in the art to which the present invention pertains. Furthermore, it may be easily seen that purposes and advantages of the present invention may be implemented by means indicated in claims and a combination thereof.

According to an aspect of the invention, a signal processing module may include a function weight table that stores weights for each of first sensors for an autonomous driving mode and an ADAS driving mode and selects and outputs a weight for each of the first sensors corresponding to a driving mode selected between the autonomous driving mode and the ADAS driving mode, a first weight applying device that generates a function weight application signal by applying the selected weight for each of the first sensors to sensing information of sensors for sensing an object, a road environment determining device that determines a road environment based on the sensing information of the sensors for sensing the object, a road environment weight table that stores weights for each of second sensors for the road environment and select and outputs a weight for each of second sensors, the selected weight for each of the second sensors corresponding to a result determined by the road environment determining device, and a second weight applying device that outputs a dataset by applying the selected weight for each of the second sensors to the function weight application signal.

According to another aspect of the invention, a signal processing module may include a plurality of sensors that determines an object outside a vehicle, an internal communication module that communicates with controllers inside the vehicle, an external communication module that communicates with devices outside the vehicle, and a signal processing module that applies a first weight according to a driving mode and a second weight for a road environment to information obtained by communicating with at least one of the plurality of sensors, the internal communication module, or the external communication module.

According to another aspect of the invention, a signal processing module may include a frame mounted on a roof rack of a vehicle, a rail disposed on an upper portion of the frame; and a plurality of modules that moves along the rail. At least one of the plurality of modules may include a motor for moving along the rail.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
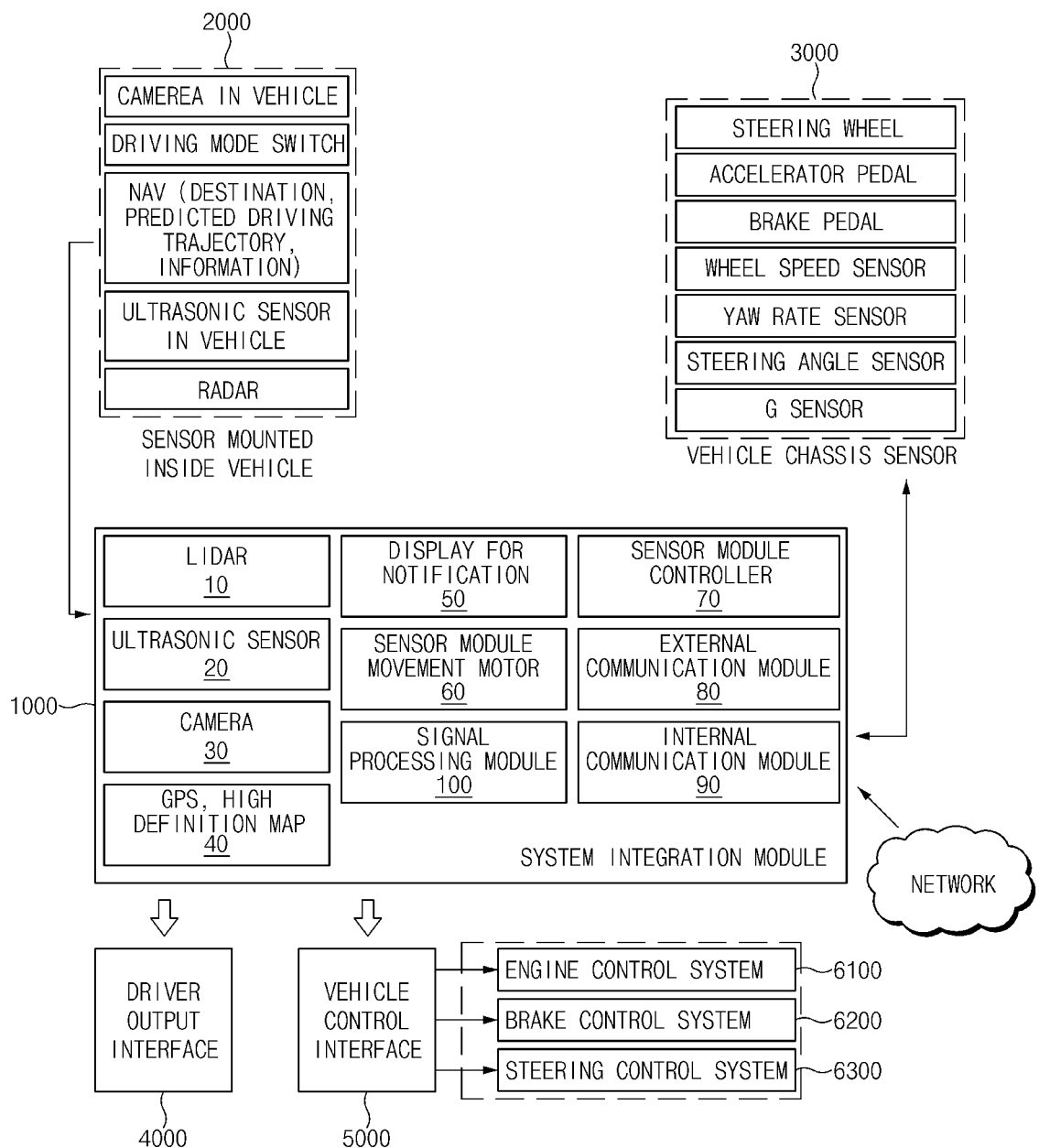
FIG. 1 is a block diagram schematically illustrating a configuration of a vehicle to which a system integration module is applied according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element or layer, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments will be described in detail with reference to FIGS. 1, 2, 3, 4, and 5.

FIG. 1 is a block diagram schematically illustrating a configuration of a vehicle to which a system integration module (1000) is applied according to an exemplary embodiment.

Referring to FIG. 1, the system integration module (1000) according to an exemplary embodiment may be integrally configured with control units in a vehicle or may be implemented as a separate device to be connected with the control units of the vehicle by a separate connection means.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Referring to FIG. 1, the system integration module (1000) according to an exemplary embodiment may include a plurality of modules. In this case, at least one of the plurality of modules may include a device and a sensor for detecting an object located around the vehicle. At least one of the plurality of modules may include a communication module which facilitates wired/wireless communication between components or devices in the vehicle. At least one of the plurality of modules may include a communication module which facilitates wireless communication with a device outside the vehicle. At least one of the plurality of modules may include a motor for moving a plurality of modules mounted on the system integration module (1000) and a module for controlling the motor.

For example, the system integration module (1000) may include at least one of a light detection and ranging (LiDAR) (10), an ultrasonic sensor (20), a camera (30), or the like for detecting an object located around the vehicle.

The system integration module (1000) may include a module for storing a high definition map (40). The high definition map (40) may refer to a map having accuracy of a level where an error range is considerably reduced, for example, a level within an error range of 10 cm, which may include information about various structures, such as traffic lights, signposts, curbs, and road surface marks, as well as information of a line unit such as road centerlines or boundary lines.

The system integration module (1000) may include a display for notification (50). The display included in the system integration module (1000) may be a configuration for providing visual information to the outside of the vehicle.

The system integration module (1000) may include an internal communication module (90), such as a controller area network (CAN) module, a local Internet network (LIN) module, a flex-ray module, and an Ethernet module, which facilitates wired/wireless communication between components and devices in the vehicle.

The system integration module (1000) may include an external communication module (80) used for vehicle-to-everything (V2X) communication capable of being connected with an external network which facilitates wireless communication with a device outside the vehicle.

The system integration module (1000) may include a sensor module movement motor (60) for moving a device, a component, or a module, such as a communication module, a display, and an object detector, which is mounted on the system integration module (1000), and a sensor module controller (70) for controlling the motor.

The system integration module (1000) may include a signal processing module (100) for performing signal processing of sensing signals of sensors, such as a LiDAR (10), a camera (30), and an ultrasonic sensor (20), for detecting an object. The signal processing module (100) may perform signal processing of assigning a weight to sensing signals of sensors for detecting an object.

In detail, the signal processing module (100) may assign a weight according to a function, such as selection of autonomous driving and selection of ADAS driving, for each sensor and may assign a weight according to a weather environment, road information, and a road situation for each sensor.

The system integration module (1000) having the above-mentioned configuration may perform wired/wireless communication with a sensor and device mounted inside the vehicle (2000), a sensor and device for controlling a vehicle chassis (3000), a driver output interface (4000), and a vehicle control interface (5000).

For example, the system integration module (1000) may perform wired/wireless communication with a sensor and a device mounted inside the vehicle (2000), for example, a camera in the vehicle, a driving mode switch, a navigation NAV, an ultrasonic sensor in the vehicle, or a radar.

The system integration module (1000) may perform wired/wireless communication with a sensor and a device for control a vehicle chassis (3000), for example, a steering wheel, an accelerator pedal, a brake pedal, a wheel speed sensor, a yaw rate sensor, a steering angle sensor, and a gravity (G) sensor.

The system integration module (1000) may perform wired/wireless communication with the driver output interface (4000) for providing a driver with visual information and voice information. For example, the driver output interface (4000) may include a speaker and a display installed in the vehicle.

The system integration module (1000) may perform wired/wireless communication with the vehicle control interface (5000). For example, the system integration module (1000) may provide the vehicle control interface (5000) with object and manipulation information detected inside/outside the vehicle.

The vehicle control interface (5000) may control motion of the vehicle based on the information provided from the system integration module (1000). The vehicle control interface (5000) may control an engine control system (6100), a brake control system (6200), and a steering control system (6300) based on the information provided from the system integration module (1000).

Figure 2:
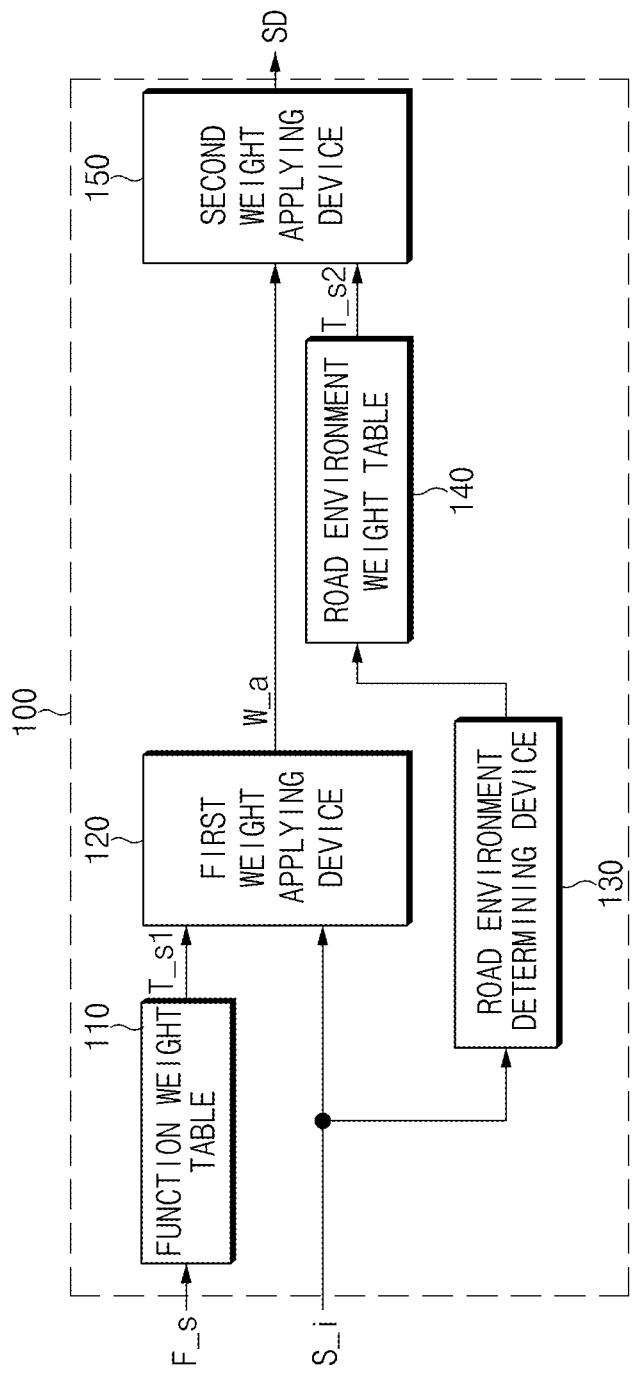
FIG. 2 is a block diagram illustrating a configuration of a signal processing module included in a system integration module according to an exemplary embodiment.

FIG. 2 is a block diagram illustrating a configuration of a signal processing module included in a system integration module according to an exemplary embodiment.

Referring to FIG. 2, a signal processing module 100 according to an exemplary embodiment may include a function weight table 110, a first weight applying device 120, a road environment determining device 130, a road environment weight table 140, and a second weight applying device 150.

The function weight table 110 may store function weights for each sensor. The function weight table 110 may select a function weight for each sensor, which corresponds to a vehicle function selected by a driver, and may output the selected function weight as a function selection weight $T\_s1$.

For example, the function weight table 110 may store a function weight for each sensor, which is applied during autonomous driving, and a function weight for each sensor, which is applied during ADAS driving. Furthermore, the function weight table 110 may select one of a function weight for each sensor, which is applied during autonomous driving, or a function weight for each sensor, which is applied during ADAS driving, based on a function selection signal $F\_s$ input according to a vehicle function selected by the driver and may output the selected function weight for each sensor as the function selection weight $T\_s1$.

In detail, when the function selection signal $F\_s$ is enabled, the function weight table 110 may output a function weight for each sensor, which is used during autonomous driving, as the function selection weight $T\_s1$. When the function selection signal $F\_s$ is disabled, the function weight table 110 may output a function weight for each sensor, which is used during ADAS driving, as the function selection weight $T\_s1$.

The first weight applying device 120 may receive the function selection weight $T\_s1$ from the function weight table 110 and may receive a sensing signal $S\_i$ of each of sensors for detecting objects inside and outside the vehicle. The first weight applying device 120 may output a function weight application signal $W\_a$ by applying the function selection weight $T\_s1$ is to the sensing signal $S\_i$. In this case, the sensing signal $S\_i$ may include sensing results of sensors for detecting objects inside and outside the vehicle, for example, a sensing result of a LiDAR, a sensing result of an ultrasonic sensor, an obtained image of a camera, location information of a high definition map according to a global positioning system (GPS), and a sensing result of a radar.

The road environment determining device 130 may determine an environment of the road where the vehicle is currently traveling, based on the sensing signal $S\_i$.

For example, the road environment determining device 130 may determine a weather environment, road information, and a road situation of the road where the vehicle is currently traveling, based on the sensing signal $S\_i$. In this case, the determining of the weather environment may include determining weather, such as snow, rain, or fog on the road, and determining time, such as day and night. The determining of the road information may include determining a road shape such as a tunnel or a bridge. The determining of the road situation may include distinguishing city driving from out-of-city driving, distinguishing highway driving from national highway driving, and determining the volume of traffic on the road.

The road environment weight table 140 may store road environment determination weights for each sensor. The road environment weight table 140 may select at least one of road environment determination weights depending on the result determined by the road environment determining device 130 and may output the selected road environment determination weight for each sensor as an environment determination weight $T\_s2$.

For example, the road environment weight table 140 may select road environment determination weights for each sensor, which correspond to the results of determining a weather environment, road information, and a road situation included in the result of determining the road environment at the road environment determining device 130 and may output the selected road environment determination weight for each sensor as the environment determination weight $T\_s2$.

The second weight applying device 150 may receive the function weight application signal $W\_a$ from the first weight applying device 120 and may receive the environment determination weight $T\_s2$ from the road environment weight table 140. The second weight applying device 150 may output a weight application dataset SD by applying the environment determination weight $T\_s2$ to the function weight application signal $W\_a$. In this case, the weight application dataset SD may be used for ADAS driving and autonomous driving.

Figure 3:
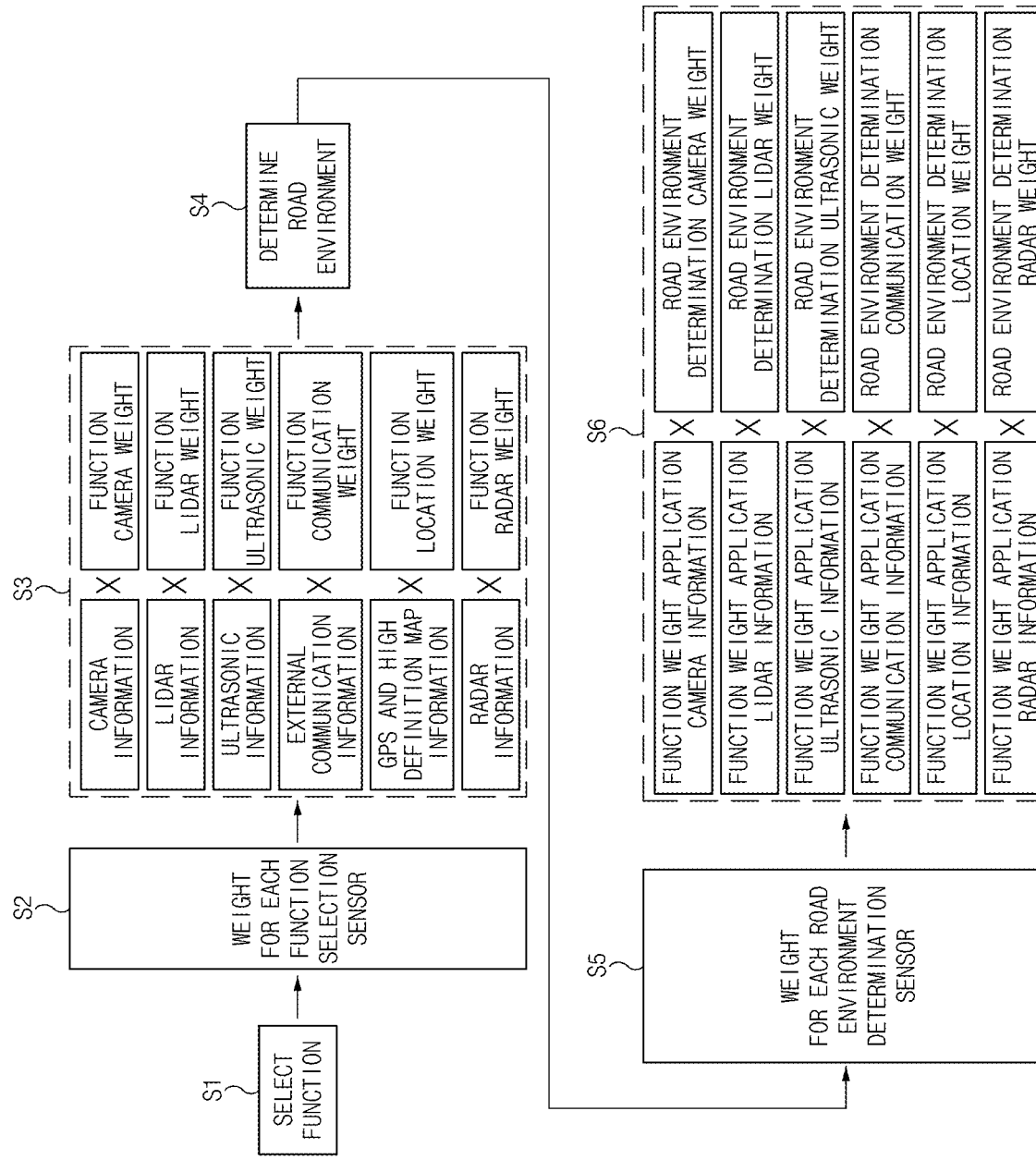
FIGS. 3 and 4 are flowcharts illustrating an operation of a signal processing module included in a system integration module according to an exemplary embodiment.
Figure 4:
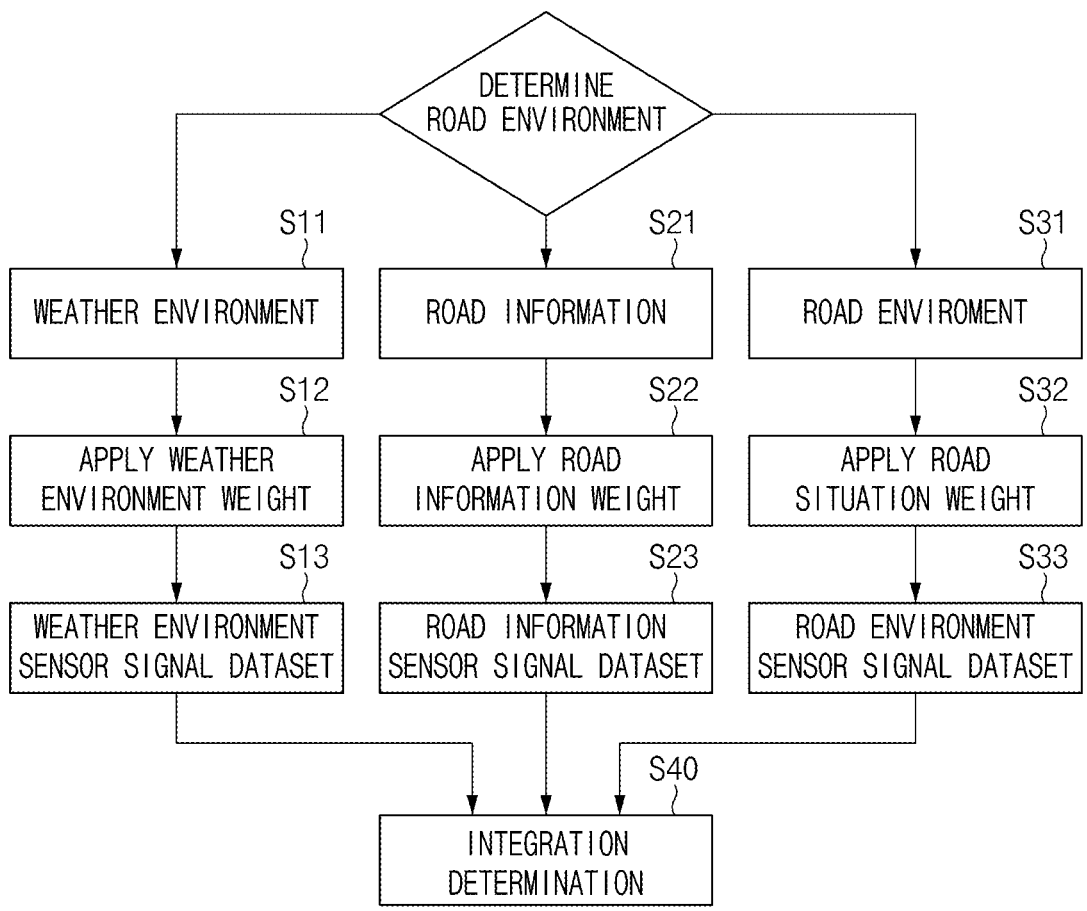

FIGS. 3 and 4 are flowcharts illustrating an operation of a signal processing module included in a system integration module according to an exemplary embodiment.

FIG. 3 is a flowchart illustrating an operation method of a signal processing module included in a system integration module according to an exemplary embodiment. Referring to FIG. 3, an operation method of a signal processing module included in the system integration module (1000) of FIG. 2 may include the steps of selecting a function (S1), selecting a weight for each function selection sensor (S2), applying a first weight (S3), determining a road environment (S4), selecting a weight for each road environment determination sensor (S5), and applying a second weight (S6).

The step of selecting the function (S1) may include selecting autonomous driving or ADAS driving by a driver.

The step of selecting the weight for each function selection sensor (S2) may include selecting a weight for each sensor for autonomous driving or selecting a weight for each sensor for ADAS driving.

For example, a weight for each of a plurality of pieces of information capable of being provided to the system integration module according to an exemplary embodiment, for example, image information (e.g., camera information) obtained from a camera, LiDAR information obtained from a LiDAR, ultrasonic information obtained from an ultrasonic sensor, external communication information obtained from an external communication module, high definition map information obtained from a GPS and a high definition map, and radar information obtained from a radar, may be selected. In addition, the weight for each of the plurality of pieces of information may vary with the selection of autonomous driving or the selection of ADAS driving.

In detail, when a weight for camera information is A during autonomous driving, a weight for camera information may be B during ADAS driving. A and B may be the same value or different values.

To sum up, after selecting one of the autonomous driving or the ADAS driving in the step S1, the step of selecting the weight for each function selection sensor (S2) may include selecting a weight for each sensor for the selected driving.

The step of applying the first weight (S3) may include applying the weight for each sensor, which is selected in the step S2, to a sensing signal S_i provided to the signal processing module included in the system integration module (1000), e.g., information obtained from each sensor.

For example, in the step S3, the camera weight selected in the step S2 may be applied to camera information. In this case, the camera weight selected in the step S2 may refer to a function camera weight, and a value of the function camera weight when autonomous driving or ADAS driving is selected may be varied or same.

For example, in the step S3, the LiDAR weight selected in the step S2 may be applied to LiDAR information. In this case, the LiDAR weight selected in the step S2 may refer to a function LiDAR weight, and a value of the function LiDAR weight when autonomous driving or ADAS driving is selected may be varied or same.

For example, in the step S3, the ultrasonic weight selected in the step S2 may be applied to ultrasonic information. In this case, the ultrasonic weight selected in the step S2 may refer to a function ultrasonic weight, and a value of the function ultrasonic weight when autonomous driving or ADAS driving is selected may be varied or same.

For example, in the step S3, the communication weight selected in the step S2 may be applied to external communication information. In this case, the communication weight selected in the step S2 may refer to a function communication weight, and a value of the function communication weight when autonomous driving or ADAS driving is selected may be varied or same.

For example, in the step S3, the location weight selected in the step S2 may be applied to high definition map information. In this case, the location weight selected in the step S2 may refer to a function location weight, and a value of the function location weight when autonomous driving or ADAS driving is selected may be varied or same.

For example, in the step S3, the radar weight selected in the step S2 may be applied to radar information. In this case, the radar weight selected in the step S2 may refer to a function radar weight, and a value of the function radar weight when autonomous driving or ADAS driving is selected may be varied or same.

The step of determining the road environment (S4) may be determining an environment of the road where the vehicle is currently traveling, which may include determining is weather information including weather and time, determining road information including a road shape such as a tunnel or a bridge, and distinguishing city driving from out-of-city driving, distinguishing highway driving from national highway driving, and determining a volume of traffic on the road.

The step of selecting the weight for each road environment determination sensor (S5) may include selecting a weight for each sensor, which corresponds to the result determined in the step S4.

The step of applying the second weight (S6) may include applying the weight for each sensor, which is selected in the step S5, to the information to which the weight is applied in the step S3.

For example, in the step S6, the camera weight selected in the step S5 may be applied to the camera information to which the function weight is applied in the step S3. In this case, the camera weight selected in the step S5 may refer to a road environment determination camera weight.

For example, in the step S6, the LiDAR weight selected in the step S5 may be applied to the LiDAR information to which the function weight is applied in the step S3. In this case, the LiDAR weight selected in the step S5 may refer to a road environment determination LiDAR weight.

For example, in the step S6, the ultrasonic weight selected in the step S5 may be applied to the ultrasonic information to which the function weight is applied in the step S3. In this case, the ultrasonic weight selected in the step S5 may refer to a road environment determination ultrasonic weight.

For example, in the step S6, the communication weight selected in the step S5 may be applied to the communication information to which the function weight is applied in the step S3. In this case, the communication weight selected in the step S5 may refer to a road environment determination communication weight.

For example, in the step S6, the location weight selected in the step S5 may be applied to the location information to which the function weight is applied in the step S3. In this case, the location weight selected in the step S5 may refer to a road environment determination location weight.

For example, in the step S6, the radar weight selected in the step S5 may be applied to the radar information to which the function weight is applied in the step S3. In this case, the radar weight selected in the step S5 may refer to a road environment determination radar weight.

FIG. 4 is a flowchart illustrating in detail the steps of determining a road environment (S4) in FIG. 3, selecting a weight for each road environment determination sensor (S5) in FIG. 3, and applying a second weight (S6) in FIG. 3.

As shown in FIG. 4, the step of determining the road environment (S4) may include the steps of determining a weather environment (S11), determining road information (S21), and determining a road situation (S31).

The step of determining the weather environment (S11) may be determining a weather environment of the road based on external communication information and camera information, which may include determining that it is rain, that it is snow, or that it is night.

When it is determined that it is rain, that it is snow, or that it is night in the step S11, in the step S5, the highest weight may be selected for radar information and location information and the lowest weight may be selected for camera information.

In the step S12, the highest weight selected in the step S5 may be applied to radar information and location information and the lowest weight selected in the step S5 may be applied to camera information.

In the step S13, the sensing results (e.g., the radar information, the location information, and the camera information) to which the weights are applied in the step S11 and S12 may be output as a weather environment sensor signal dataset.

The step of determining the road information (S21) may be determining a shape of the road where the vehicle is currently traveling, which may include determining whether the road where the vehicle is currently traveling is a tunnel or a bridge.

When it is determined that the road where the vehicle is currently traveling is the tunnel or the bridge in the step S21, in the step S5, the highest weight may be selected for LiDAR information and location information and a weight lower than that for the LiDAR information and the location information may be selected for radar information and camera information.

In the step S22, the highest weight may be applied to LiDAR information and location information and a low weight may be applied to radar information and camera information.

In the step S23, the sensing results (e.g., the LiDAR information, the location information, the radar information, and the camera information) to which the weights are applied in the steps of S21 and S22 may be output as a road information sensor signal dataset.

The step of determining the road situation (S31) may include distinguishing city driving from out-of-city driving, distinguishing highway driving from national highway driving, and determining the volume of traffic on the road.

When it is determined that the current driving is the city driving with heavy traffic in the step S31, the highest weight may be selected for LiDAR information, camera information, and location information and a weight lower than that for the LiDAR information, the camera information, and the location information may be selected for radar information.

In the step S32, the highest weight may be applied to LiDAR information, camera information, and location information and a low weight may be applied to radar information.

In the step S33, the sensing results (e.g., the LiDAR information, the camera information, the location information, the radar information) to which the weights are applied in the steps S31 and S32 may be output as a road situation sensor signal dataset.

The step of performing the integration determination (S40) may include outputting the sensing results to which the weights are applied according to the determination of the road environment, based on the weather environment sensor signal dataset, the road information sensor signal dataset, and the road situation sensor signal dataset.

For example, the step of performing the integration determination (S40) may include processing sensing results duplicated among the sensing results included in the weather environment sensor signal dataset, the road information sensor signal dataset, and the road situation sensor signal dataset.

Assuming that there is duplicated camera information in the weather environment sensor signal dataset, the road information sensor signal dataset, and the road situation sensor signal dataset, in the step S40, all of values of the camera information of the weather environment sensor signal dataset, the camera information of the road information sensor signal dataset, and the camera information of the road situation sensor signal dataset may be added and output.

Furthermore, assuming that there is duplicated camera information in the weather environment sensor signal dataset, the road information sensor signal dataset, and the road situation sensor signal dataset, in the step S40, only the camera information having the same value among values of the camera information of the weather environment sensor signal dataset, the camera information of the road information sensor signal dataset, and the camera information of the road situation sensor signal dataset may be output.

Furthermore, assuming that there is duplicated camera information in the weather environment sensor signal dataset, the road information sensor signal dataset, and the road situation sensor signal dataset, in the step S40, only the camera information having a plurality of the same values among values of the camera information of the weather environment sensor signal dataset, the camera information of the road information sensor signal dataset, and the camera information of the road situation sensor signal dataset may be output.

Figure 5:
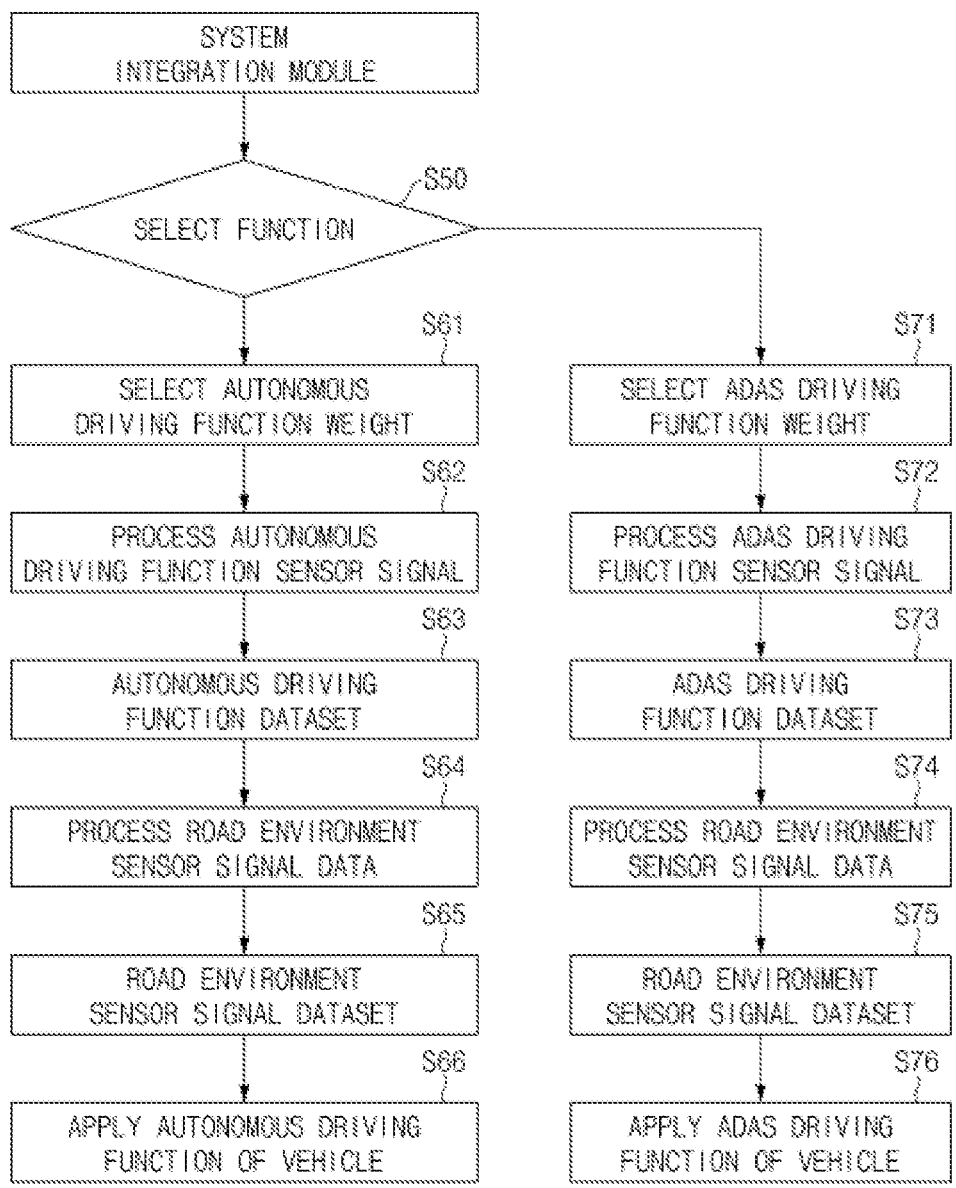
FIG. 5 is a flowchart illustrating an operation of a system integration module according to an exemplary embodiment.

FIG. 5 is a flowchart illustrating an operation of a system integration module according to an exemplary embodiment.

The system integration module may receive sensing results from a camera, an ultrasonic sensor, and a radar installed in the vehicle other than a LiDAR, an ultrasonic sensor, a camera, and a high definition map loaded into the system integration module.

As such, the system integration module may receive sensing results of sensors for determining objects which are present inside or outside the vehicle.

Furthermore, the system integration module may receive a plurality of pieces of information used for vehicle driving from a network outside the vehicle via a communication module.

The system integration module according to an exemplary embodiment may apply a weight according to a driving mode (e.g., an autonomous driving mode or an ADAS driving mode) selected by a driver and a weight according to an environment of the road where the vehicle is currently traveling to all of information applied to the system integration module and may use the applied information for autonomous driving or ADAS driving, thus having an effect on safe driving by accurately determining an object.

Such an operation of the system integration module will be described with reference to FIG. 5.

In the step S50, a driver may ride in a vehicle equipped with the system integration module according to an exemplary embodiment and may select autonomous driving or ADAS driving.

When the driver selects the autonomous driving, in the step S61, a weight for each sensor for the autonomous driving may be selected.

After the step S61 is performed, in the step S62, the selected weight for each sensor may be applied to sensing information of each of sensors.

After the step S62 is performed, in the step S63, the sensing information to which the weight for the selection of the autonomous driving is applied may be output as an autonomous driving function dataset.

After the weight is selected according to the environment of the road where the vehicle is currently traveling, in the step S64, the selected weight may be applied to the autonomous driving function dataset output in the step S63.

After the step S64 is performed, in the step S65, the autonomous driving function dataset to which the weight for the road environment is applied may be output as a road environment sensor signal dataset.

In the step S66, the road environment sensor signal dataset may be applied to an autonomous driving function of the vehicle.

When the driver selects the ADAS driving, in the step S71, a weight for each sensor for the ADAS driving may be selected.

After the step S71 is performed, in the step S72, the selected weight for each sensor may be applied to sensing information of each of sensors.

After the step S72 is performed, in the step S73, the sensing information to which the weight for the selection of the ADAS driving is applied may be output as an ADAS driving function dataset.

After the weight is selected according to the environment of the road where the vehicle is currently traveling, in the step S74, the selected weight may be applied to the ADAS driving function dataset output in the step S73.

After the step S74 is performed, in the step S75, the ADAS driving function dataset to which the weight for the road environment is applied may be output as a road environment sensor signal dataset.

In the step S76, the road environment sensor signal dataset may be applied to an ADAS driving function of the vehicle.

Figure 6:
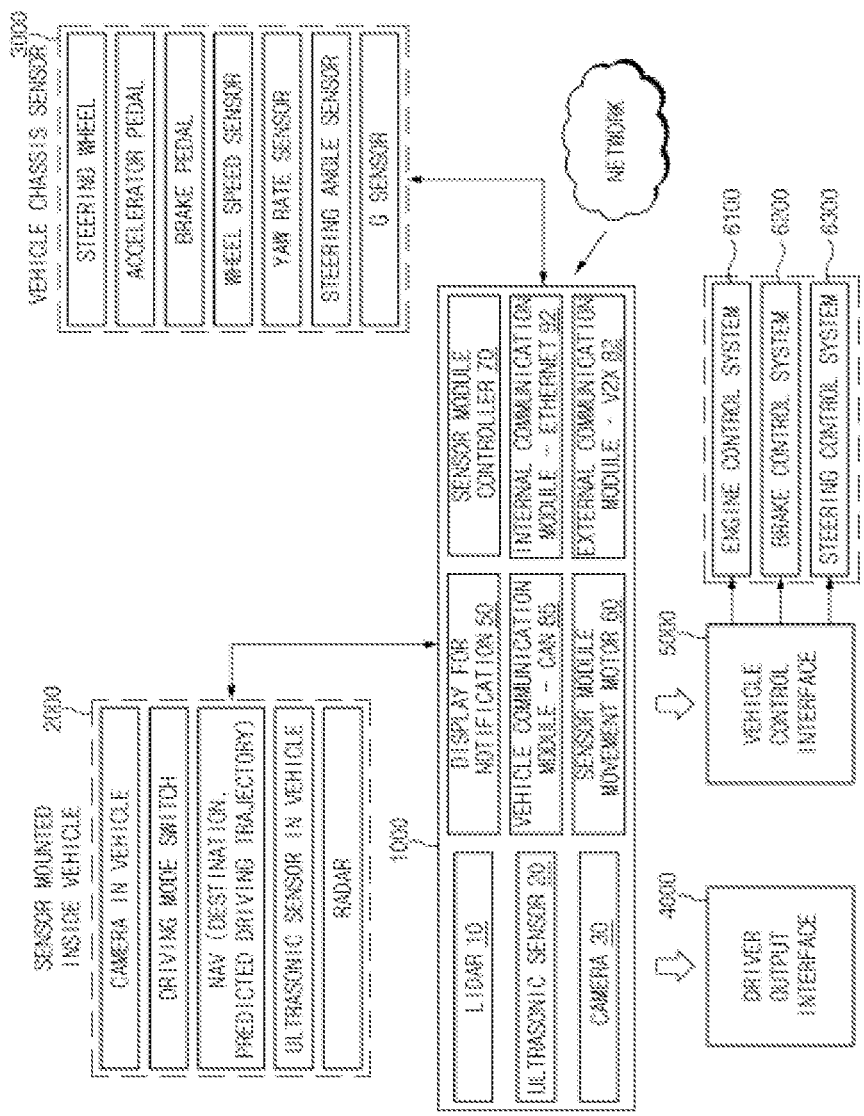
FIG. 6 is a block diagram schematically illustrating a configuration of a vehicle to which a system integration module is applied according to another exemplary embodiment.

FIG. 6 is a block diagram schematically illustrating a configuration of a vehicle to which a system integration module is applied according to another exemplary embodiment.

Referring to FIG. 6, a system integration module (1000) according to another exemplary embodiment may include a plurality of modules. In this case, at least one of the plurality of modules may include a device and a sensor for detecting an object located around the vehicle. At least one of the plurality of modules may include a communication module which facilitates wired/wireless communication between components or devices in the vehicle. At least one of the plurality of modules may include a communication module which facilitates wireless communication with a device outside the vehicle. At least one of the plurality of modules may include a motor for moving the plurality of modules mounted on the system integration module (1000). At least one of the plurality of modules may include a motor control module for controlling at least one motor for moving the modules mounted on the system integration module (1000). At least one of the plurality of modules may include a display module.

For example, the system integration module (1000) may include at least one of a LiDAR, an ultrasonic sensor, a camera, or the like for detecting an object located around the vehicle.

The system integration module (1000) may include a display. The display included in the system integration module (1000) may be a configuration for providing visual information to the outside of the vehicle.

The system integration module (1000) may include a communication module, such as a controller area network (CAN) module, a local Internet network (LIN) module, a flex-ray module, and an Ethernet module, which facilitates wired/wireless communication between components and devices in the vehicle.

The system integration module (1000) may include a module used for vehicle-to-everything (V2X) communication capable of being connected with an external network which facilitates wireless communication with a device outside the vehicle.

The system integration module (1000) may include a motor for moving a device, a component, or a module, such as a communication module, a display, and an object detector, which is equipped with the system integration module (1000), and a module for controlling the motor.

The system integration module (1000) having the above-mentioned configuration may perform wired/wireless communication with a sensor and device mounted inside the vehicle, a sensor and device for controlling a vehicle chassis, a driver output interface, and a vehicle control interface.

For example, the system integration module (1000) may perform wired/wireless communication with a sensor and a device mounted inside the vehicle, for example, a camera in the vehicle, a driving mode switch, a navigation NAV, an ultrasonic sensor in the vehicle, or a radar.

The system integration module (1000) may perform wired/wireless communication with a sensor and a device for control a vehicle chassis, for example, a steering wheel, an accelerator pedal, a brake pedal, a wheel speed sensor, a yaw rate sensor, a steering angle sensor, and a gravity (G) sensor.

The system integration module (1000) may perform wired/wireless communication with the driver output interface for providing a driver with visual information and voice information. For example, the driver output interface may include a speaker and a display installed in the vehicle.

The system integration module (1000) may perform wired/wireless communication with the vehicle control interface. For example, the system integration module (1000) may provide the vehicle control interface with object and manipulation information detected inside/outside the vehicle.

The vehicle control interface may control motion of the vehicle based on the information provided from the system integration module (1000). The vehicle control interface may control an engine control system, a brake control system, and a steering control system based on the information provided from the system integration module (1000).

Figure 7:
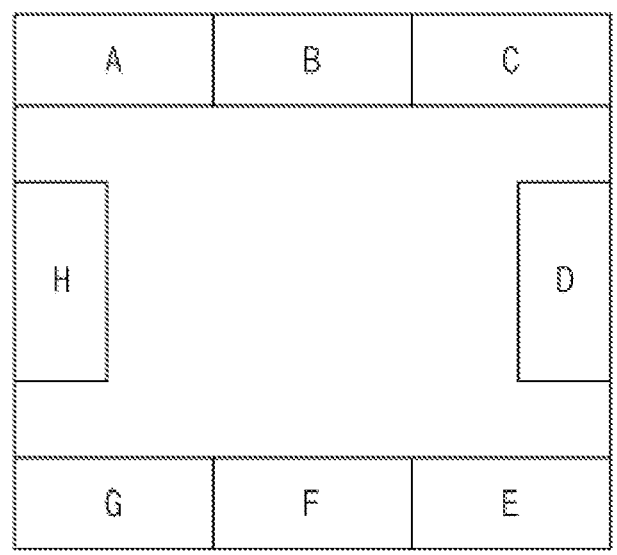
FIG. 7 is a plan view illustrating a system integration module according to another exemplary embodiment.

FIG. 7 is a plan view illustrating a system integration module according to another exemplary embodiment.

Referring to FIG. 7, a plurality of modules of a system integration module (1000) according to another exemplary embodiment may be arranged on locations A, B, C, D, E, F, G, and H, respectively. Hereinafter, the locations A, B, C, D, E, F, G, and H where the plurality of modules are respectively arranged may be referred to as the plurality of modules.

At least one of the plurality of modules A, B, C, D, E, F, G, and H arranged in the system integration module (1000) may include a motor for moving each module and a module for controlling the motor.

Thus, at least one of the plurality of modules A, B, C, D, E, F, G, and H arranged in the system integration module (1000) may be moved by the motor.

As described with reference to FIG. 6, at least one of the plurality of modules A, B, C, D, E, F, G, and H arranged in the system integration module (1000) may include one of sensors mounted outside the vehicle, for sensing an object outside the vehicle, for example, a LiDAR, an ultrasonic sensor, or a camera.

Furthermore, at least one of the plurality of modules A, B, C, D, E, F, G, and H arranged in the system integration module (1000) may include a communication module capable of communicating with each of a sensor (2000) mounted inside the vehicle, a vehicle chassis sensor (3000), a driver output interface (4000), and a vehicle control interface (5000).

In this case, the sensor (2000) mounted inside the vehicle may include a camera in the vehicle, a driving mode switch, a navigation NAV, an ultrasonic sensor in the vehicle, a radar, or the like. The vehicle chassis sensor (3000) may include a steering wheel sensor, an accelerator pedal sensor, a brake pedal sensor, a wheel speed sensor, a yaw rate sensor, a steering angle sensor, a gravity (G) sensor, or the like. The driver output interface (4000) may include a speaker and a display installed in the vehicle. The vehicle control interface (5000) may communicate with an engine control system to control an output of an engine, may communicate with a brake control system to control braking of the vehicle, and may communicate with a steering control system to control steering of the vehicle.

In addition, at least one of the plurality of modules A, B, C, D, E, F, G, and H arranged in the system integration module (1000) may include a communication module capable of communicating with a network outside the vehicle.

For example, at least one of the plurality of modules A, B, C, D, E, F, G, and H arranged in the system integration module (1000) may determine a driving plan of the vehicle based on the result sensed by the sensor mounted outside the vehicle, the result sensed by the sensor (2000) mounted inside the vehicle, and the result sensed by the vehicle chassis sensor (3000) and may provide the determined result to the driver output interface (4000) and the vehicle control interface (5000).

For example, at least one of the plurality of modules A, B, C, D, E, F, G, and H arranged in the system integration module (1000) may determine a driving plane of the vehicle based on an object outside the vehicle, an object inside the vehicle, and a situation where the vehicle is currently traveling (e.g., compare the result of determining objects inside and outside the vehicle with a current driving situation to determine a future driving plan) and may deliver the determined result to the driver output interface (4000), thus delivering the future driving plan as visual or audible information to the driver.

Furthermore, at least one of the plurality of modules A, B, C, D, E, F, G, and H arranged in the system integration module (1000) may determine a driving plane of the vehicle based on an object outside the vehicle, an object inside the vehicle, and a situation where the vehicle is currently traveling (e.g., compare the result of determining objects inside and outside the vehicle with a current driving situation to determine a future driving plan) and may transmit the determined result to the engine control system, the brake control system, and the steering control system through the vehicle control interface (5000), thus controlling driving of the vehicle using the driving plan.

As shown in FIG. 7, the plurality of modules A, B, C, D, E, F, G, and H in the system integration module (1000) according to another exemplary embodiment may be arranged on edges of the system integration module (1000).

Furthermore, because at least one of the plurality of modules A, B, C, D, E, F, G, and H arranged in the system integration module (1000) according to another exemplary embodiment includes a motor, the modules, each of includes the motor, may be moved.

FIGS. 8A, 8B, 8C, and 8D are drawings illustrating an operation of a system integration module according to another exemplary embodiment.

Figure 8A:
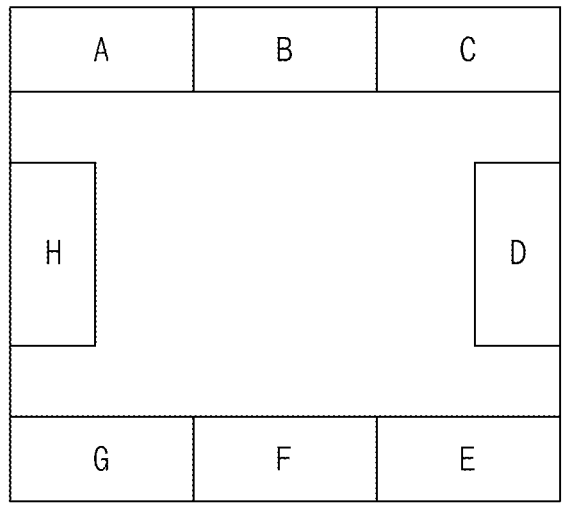
FIGS. 8A, 8B, 8C, and 8D are drawings illustrating an operation of a system integration module according to another exemplary embodiment.

FIG. 8A is a drawing illustrating a case where a plurality of modules A, B, C, D, E, F, G, and H included in a system integration module (1000) are arranged on edges of the system integration module (1000).

Figure 8B:
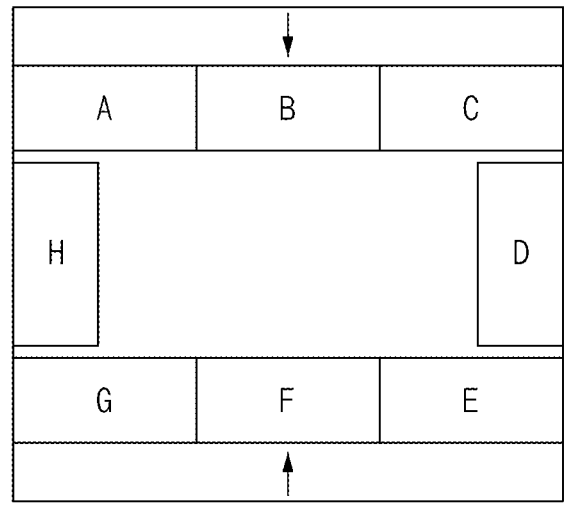

FIG. 8B is a drawing illustrating a case where modules A, B, C, E, F, and G arranged in rows among a plurality of modules A, B, C, D, E, F, G, and H included in a system integration module (1000) move to the center of the system integration module (1000).

Figure 8C:
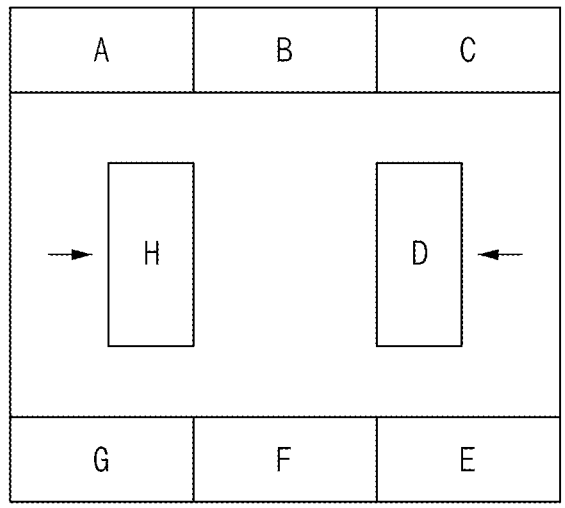

FIG. 8C is a drawing illustrating a case where modules D and H arranged in columns among a plurality of modules A, B, C, D, E, F, G, and H included in a system integration module (1000) move to the center of the system integration module (1000).

Figure 8D:
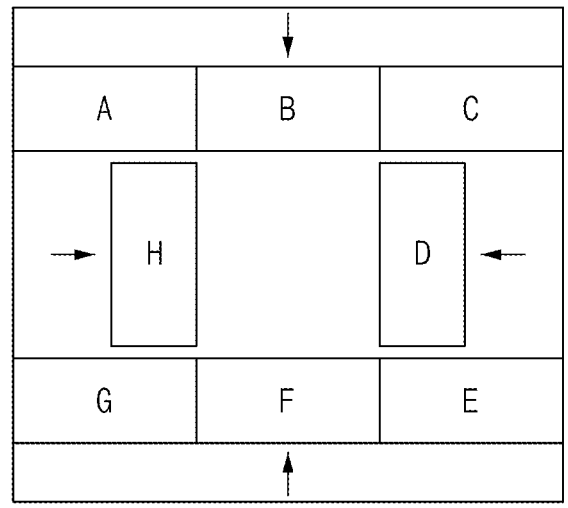

FIG. 8D is a drawing illustrating a case where all of a plurality of modules A, B, C, D, E, F, G, and H included in a system integration module (1000) move to the center of the system integration module (1000).

In FIGS. 8A, 8B, 8C, and 8D, it is shown that modules arranged in rows and columns among the plurality of modules A, B, C, D, E, F, G, and H arranged in the system integration module (1000) are moved, but one module may be moved.

In FIG. 8B, it is shown that the modules A, B, and C in an upper row and the modules E, F, and G in a lower row are simultaneously moved, but only the modules A, B, and C in the upper row may be moved or only the modules E, F, and G in the lower row may be moved.

In FIG. 8C, it is shown that the module H in a left column and the module D in a right column are simultaneously moved, but only the module H in the left column may be moved or only the module D in the right column may be moved.

Figure 9:
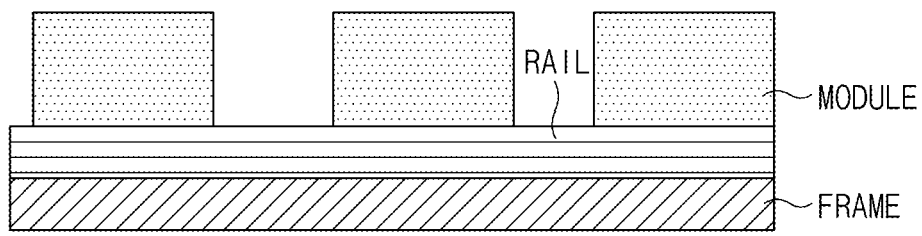
FIG. 9 is a side view illustrating a system integration module according to another exemplary embodiment.

FIG. 9 is a side view illustrating a system integration module according to another exemplary embodiment.

As shown in FIG. 9, a system integration module (1000) according to another exemplary embodiment may include a frame, a rail, and a module.

The system integration module (1000) may include the frame such that the system integration module (1000) is mounted on a roof rack of a vehicle.

The system integration module (1000) may include the rail capable of moving a module including a motor among a plurality of modules included in the system integration module (1000). In this case, the rail may be disposed on an upper portion of the frame. As described above, the system integration module (1000) may include the module including the motor.

Figure 10:
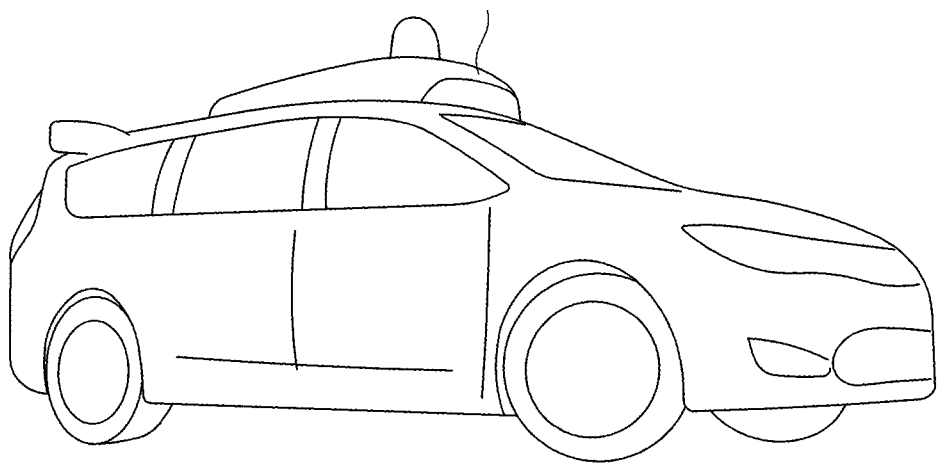
FIG. 10 is a drawing illustrating a vehicle to which a system integration module is applied according to another exemplary embodiment.

FIG. 10 is a drawing illustrating a vehicle to which a system integration module is applied according to another exemplary embodiment.

As shown in FIG. 10, a system integration module (1000) according to another exemplary embodiment may be mounted on a roof rack of the vehicle and may be protected by a case.

In the system integration module (1000) according to another exemplary embodiment, a device mounted on the roof rack of the vehicle and protected by the case may be referred to as an ADAS integration device.

In this case, the system integration module (1000) may include a display module capable of displaying a character, a sign, or an image on each of the front and the rear of the vehicle.

Figure 11:
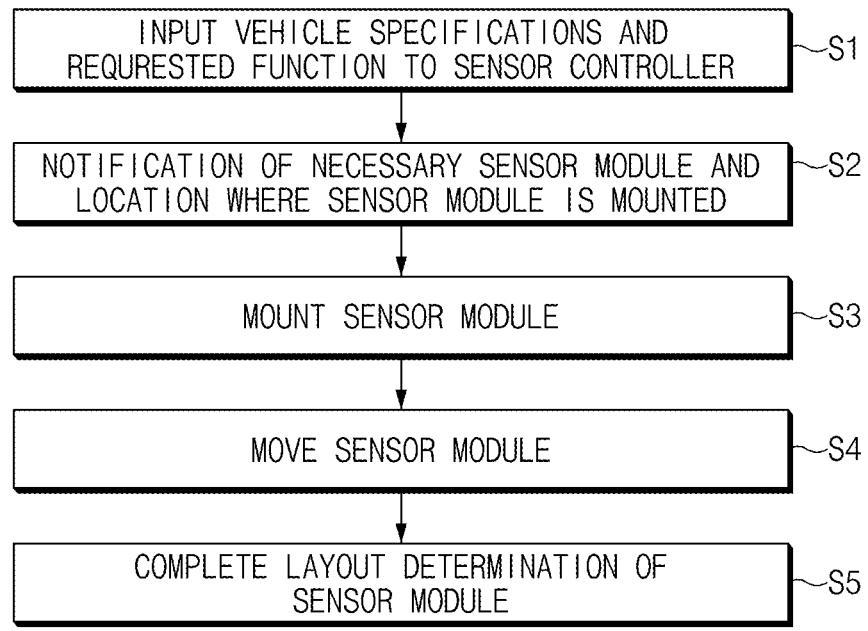
FIGS. 11 and 12 are flowcharts illustrating an operation of a system integration module according to another exemplary embodiment.
Figure 12:
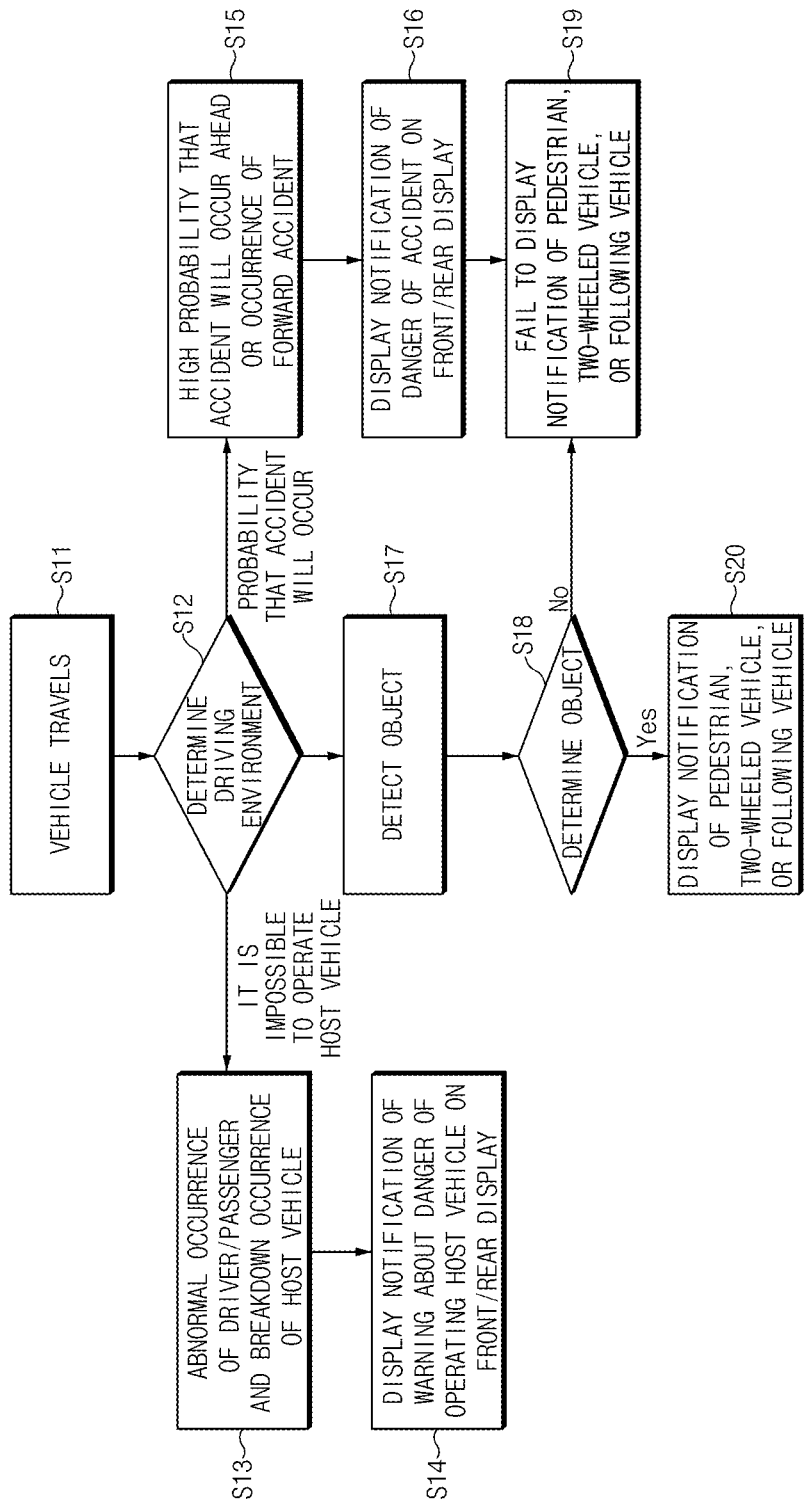

FIGS. 11 and 12 are flowcharts illustrating an operation of a system integration module according to another exemplary embodiment.

FIG. 11 is a flowchart illustrating movement according to layout of a plurality of modules included in a system integration module (1000) according to another exemplary embodiment.

As described above, the system integration module (1000) may include a plurality of modules, and at least one of the plurality of modules may include a motor to be movable from a location where it is initially disposed. Furthermore, at least one of the plurality of modules may include a module for controlling a motor. The module for controlling the motor may input and store vehicle specifications and a function requested by a designer or a driver. Such a module may be referred to as a sensor controller.

A description will be given in detail of a method for arranging a plurality of modules (e.g., sensor modules) included in the system integration module (1000) according to another exemplary embodiment with reference to FIG. 11.

The method may include operations S1 to S5. Each operation will be described below.

In the step S1, vehicle specifications and a function requested by a user or a designer may be input and stored in a sensor controller included in the system integration module (1000).

In the step S2, the sensor controller included in the system integration module (1000) may provide a notification of sensor modules according to the function requested by the user or the designer and locations where the sensor modules are mounted.

In the step S3, the sensor modules according to the function may be mounted on the system integration module (1000).

When the sensor modules are mounted on the system integration module (1000), in the step S4, the sensor modules may be moved according to the vehicle specifications.

When the locations of the sensor modules arranged on the system integration module (1000) are determined, in the step S5, the layout determination of the sensor modules may be completed.

As described above, the system integration module according to an exemplary embodiment may arrange necessary sensors modules depending on vehicle specifications and a request of the designer and the user and may move the sensor modules, thus being applicable to a vehicle irrespective of a size and type of the vehicle.

FIG. 12 is a drawing illustrating driving of a vehicle equipped with a system integration module according to another exemplary embodiment. Referring to FIG. 12, a system integration module (1000) according to an exemplary embodiment may include display modules respectively arranged on the front and the rear of the vehicle.

In the step S11, the display module may display a vehicle which starts to travel.

When the vehicle is traveling, in the step S12, the system integration module (1000) according to an exemplary embodiment may determine an environment where the vehicle is traveling. In this case, the step of determining the environment (S12) may be determining, by the system integration module (1000), an environment for the inside and outside of the vehicle, which may include determining that it is impossible to operate a host vehicle or that there is a high probability that an accident will occur.

When the system integration module (1000) is connected with a sensor (2000) mounted inside the vehicle in FIG. 6, in the step S13, it may determine whether abnormality occurs in the body of a driver or a passenger who rides in the vehicle. When the system integration module (1000) is connected to a vehicle chassis sensor (3000) of FIG. 6, in the step S13, it may determine whether the host vehicle breaks down.

When it is determined that the abnormality occurs in the body of the driver or the passenger who rides in the vehicle, the system integration module (1000) may notify the driver or the passenger of the result for the determined abnormal state through a driver output interface (4000) of FIG. 6.

When it is determined that it is impossible to operation the host vehicle, in the step S14, the system integration module (1000) may display a warning, about the danger of operating the host vehicle, as a notification on front and rear displays.

In the step S15, the system integration module (1000) may receive information about a probability that the danger of a path where the vehicle is traveling will occur, that is, information about a sharp-curved area, a school zone, a wildlife area, or the like, from a navigation among sensors (2000) mounted inside the vehicle and may determine a probability that an accident will occur ahead.

When it is determined that there is the high probability that the accident will occur ahead, in the step S16, the system integration module (1000) may display a notification of the danger of the accident on the front and rear displays.

In the step S17, the system integration module (1000) may detect an object based on the sensing results of a LiDAR, an ultrasonic sensor, and a camera.

When a pedestrian, a two-wheeled vehicle, or a following vehicle is not detected within a predetermined distance (i.e., No), in the step S19, the system integration module (1000) may fail to display a notification of the pedestrian, the two-wheeled vehicle, or the following vehicle on the front and rear displays.

When the pedestrian, the two-wheeled vehicle, or the following vehicle is detected as an object within the predetermined distance, in the step S20, the system integration module (1000) may display the notification of the pedestrian, the two-wheeled vehicle, or the following vehicle on the front and rear displays.

The illustrated exemplary embodiments may more develop the ADAS and the autonomous driving system by applying both the ADAS driving and the autonomous driving.

Furthermore, the illustrated exemplary embodiments may improve the accuracy of determining an object by applying a weight to sensing results of sensors for determining the object.

Furthermore, the illustrated exemplary embodiments may be easy to apply the ADAS to the vehicle by moving electronic components loaded into the module depending on a size and shape of the vehicle.

In addition, various effects ascertained directly or indirectly through the invention may be provided.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A system integration module including a processor and memory for outputting a dataset for accurately determining an object during autonomous driving and advanced driver assistance system (ADAS) driving to enhance safe driving, the system integration module comprising:
   a function weight table to store, in the memory, weights for each of first sensors for an autonomous driving mode and an ADAS driving mode, and to select and output, by the processor, a weight for each of the first sensors corresponding to a driving mode selected between the autonomous driving mode and the ADAS driving mode;
   a first weight applying device to generate, by the processor, a function weight application signal by applying the selected weight for each of the first sensors to sensing information of at least one of a light detection and ranging (LiDAR), a radar, a camera, or an ultrasonic sensor for sensing an object;
   a road environment determining device to determine, by the processor, at least one of a weather environment, road information, and a road situation of a road where a vehicle travels, based on information obtained from the at least one of the LiDAR, the radar, the camera, or the ultrasonic sensor;
   a road environment weight table to store, in the memory, weights for each of second sensors for the road environment, and to select and output, by the processor, a weight for each of the second sensors, the selected weight for each of the second sensors corresponding to a result determined by the road environment determining device; and
   a second weight applying device to output, by the processor, a dataset by applying the selected weight for each of the second sensors to the function weight application signal.

2. The system integration module of claim 1, wherein the road environment determining device is to distinguish when it is rain or snow from when it is not rain or snow and to distinguish day from night, to determine whether the road where the vehicle is traveling is a tunnel or a bridge, and to determine a volume of traffic on the road where the vehicle travels.

3. A system integration module including a processor and memory for accurately determining an object during autonomous driving and advanced driver assistance system (ADAS) driving to enhance safe driving, said system integration module comprising:
   a plurality of sensors including at least one of a light detection and ranging (LiDAR), a radar, a camera, or an ultrasonic sensor to determine an object outside a vehicle;
   an internal communication module to communicate with controllers inside the vehicle; and
   an external communication module to communicate with devices outside the vehicle;
   wherein the system integration module applies, by the processor, a first weight according to a driving mode and a second weight for a road environment including at least one of a weather environment, road information, and a road situation of a road where a vehicle travels, based on information obtained from the at least one of the LiDAR, the radar, the camera, or the ultrasonic sensor, the internal communication module, or the external communication module.

4. The system integration module of claim 3, wherein the system integration module applies the first weight to each of a plurality of pieces of sensing information and applies the second weight to each of the plurality of pieces of sensing information to which the first weight is applied.

5. The system integration module of claim 4, further comprising:
   a function weight table to store, in the memory, weights for each sensor for an autonomous driving mode and an ADAS driving mode, the function weight table to output, by the processor, a weight for each sensor corresponding to the driving mode selected between the autonomous driving mode and the ADAS driving mode, as the first weight;
   a first weight applying device to output, by the processor, a function weight application signal by applying the first weight to each of the plurality of pieces of sensing information;
   a road environment determining device to determine, by the processor, a road environment from the plurality of pieces of sensing information;
   a road environment weight table to store, in the memory, weights for each sensor for the road environment, and to output, by the processor, the stored weight for each sensor corresponding to the result determined by the road environment determining device, as the second weight; and
   a second weight applying device to apply, by the processor, the second weight to the function weight application signal.

* * * * *